United States Patent

Silvestrin et al.

[11] Patent Number: 6,157,341
[45] Date of Patent: Dec. 5, 2000

[54] METHOD OF PROCESSING SIGNALS OF A SATELLITE POSITIONING SYSTEM

[75] Inventors: Pierluigi Silvestrin, Oegstgeest, Netherlands; John Cooper, Leeds, United Kingdom

[73] Assignee: Agence Spatiale Europeenne, Paris, France

[21] Appl. No.: 09/215,327

[22] Filed: Dec. 18, 1998

[30] Foreign Application Priority Data

Dec. 19, 1997 [FR] France ................................. 97 16124

[51] Int. Cl.⁷ .............................. G01S 5/02; H04B 7/185; H04L 27/30; A61F 2/06
[52] U.S. Cl. ....................... 342/357.12; 375/149; 375/150
[58] Field of Search ....................... 342/357.12; 375/149, 375/150

[56] References Cited

U.S. PATENT DOCUMENTS 5,134,407   7/1992   Lorenz et al. .
5,576,715  11/1996   Litton et al. ........................ 342/357.12

FOREIGN PATENT DOCUMENTS

WO 96/27139   9/1996   WIPO .

Primary Examiner—Thomas H. Tarcza
Assistant Examiner—Fred H. Mull
Attorney, Agent, or Firm—Sughrue, Mion, Zinn, Macpeak & Seas, PLLC

[57] ABSTRACT

The invention relates to a method of treating the $L_1$ and $L_2$ signals of a positioning system in which each of said $L_1$ and $L_2$ signals presents a single frequency carrier modulated by a known pseudo-random code P, itself modulated by an unknown code W, in which:

a) each of the signals $L_1$ and $L_2$ is correlated in a respective system with a locally-generated replica of the P code;

b) the first and second correlation signals obtained over a period equal to an estimated period for a bit of the W code are integrated to obtain respective first and second W code bit signals; and c) cross-correlated is then performed thereon.

In the invention, between b) and c), a test is performed firstly to see whether the first and/or second W code bit signal is greater than a first positive threshold value or less than a first negative threshold value, and for the purposes of said cross-correlation, only those first and/or second W code bit signals are retained for which the corresponding test is satisfied.

7 Claims, 1 Drawing Sheet

METHOD OF PROCESSING SIGNALS OF A SATELLITE POSITIONING SYSTEM

The present invention relates to a method of processing positioning signals in a satellite positioning system such as the GPS system. The method making use of the $L_1$ and $L_2$ radio signals without needing to know the security code ("Y code") used for encryption.

BACKGROUND OF THE INVENTION

The NAVSTAR Global Positioning System or "GPS" was put into place by the government of the United States and it uses 24 satellites which transmit signals $L_1$ and $L_2$ at two different frequencies. These signals have respective center frequencies $f_1$=1575.42 MHz and $f_2$=1227.6 MHz, and they are generated by an onboard atomic clock operating at a frequency of 10.23 MHz.

If it is desired to compensate for effects due to propagation through the dispersive medium as constituted by the ionosphere, it is essential to have both the $L_1$ and the $L_2$ signals available simultaneously, and this is therefore essential in all applications which require high accuracy.

The $L_1$ signal is modulated in phase quadrature by two pseudo-random codes, known as the clear/acquisition (C/A) code at a rate of 1.023 MHz and by a higher-frequency second code at a rate of 10.23 MHz. The $L_2$ signal is modulated with a second code only, which second code is identical to that used for the $L_1$ signal. The C/A code is public, however the second code is used in two modes at the discretion of the operator, namely:

either in the form of a public code known as P code;

or else in the form of a security code that is secret, or difficult to obtain, known as the Y code.

The nominal operating mode of the GPS system implements the Y code. The reason for this is that the GPS operators desire to ensure that detection is not disturbed by any decoy signals which might be broadcast, in particular during military operations.

In other words, and contrary to certain opinions, the purpose of the Y code is not to degrade the performance of the GPS system for non-approved users, but to guarantee performance of the system for approved military users.

In addition, having access to the Y code in any event implies that new coding must be performed every year, which is not very practical, in particular for space-borne applications.

In order to enable civilian applications to be implemented without using the Y code, companies and research institutes have developed code-less tracking methods which make it possible to determine the $L_2$ code and the carrier phase information with good accuracy. This situation has been recognized by the government of the United States which recently declared that the $L_2$ signal can continue to be used in civilian applications, but solely for the purpose of performing accurate measurements of carrier phase. In other words, in the GPS system, signal modulation is going to remain compatible with a code-less tracking method.

Code-less tracking methods are particularly advantageous in the context of scientific applications such as geodesics, measuring movements of the Earth's crust, and meteorology, and also for determining the integrated value of the water vapor content of the troposphere, and they are presently in common use in precision receivers available on the market. In the above-mentioned applications, the main purpose is to measure the phase of the $L_2$ carrier signal so as to be able to perform a correction that takes account of propagation phenomena through the ionosphere.

Code-less tracking methods are known in particular from U.S. Pat. No. 5,134,407 (ASHTECH TELESIS) and U.S. Pat. No. 5,541, 606 (TRIMBLE).

The method described in U.S. Pat. No. 5,134,407 relies on the fact that the Y code is, in fact, the modulo-2 sum of the known P code at a rate of 10.23 MHz, plus an encrypting code generally referred to as the A code or indeed as the W code, at a rate which is considerably slower. The exact form of the W code is, naturally, not known, however it is known that its rate is about ½0th the rate of the P code, i.e. about 500 kHz.

The samples of the $L_1$ and $L_2$ signals are correlated with locally-generated replicas of the P code. The P code generators, which comprise two independent generators, or one generator together with a delay line, are controlled by a digitally controlled oscillator DCO which is in turn controlled for carrier tracking purposes by a microprocessor in a conventional phase-locked loop configuration, e.g. a Costas loop. The local P code is offset in time to be "aligned" with the input signal in order to obtain maximum energy. Once the P code replica has been correlated, the signal is filtered to reduce noise before estimating bits of the W code. This filtering is performed in a conventional manner by integration and storage, and the integration period is equal to the estimated duration $T_1$ of one bit of W code. The consequence of unknown W code being present is thus that the predictive passband cannot be reduced below the bit rate of the W code, and that the signal-to-noise ratio S/N of the predetection band is very low.

Thermal noise on the $L_1$ and $L_2$ signals is statistically independent. This is used to decide on the sign of the W code bit in each of the two systems, $L_1$ and $L_2$, and to apply the result to the other system. This cross-correlation method makes it possible to use an integration period $T_2$ that is longer than $T_1$, thereby decreasing noise and increasing the post-detection signal/noise ratio. It is possible mathematically to determine the probability of a wrong decision being made in a predetection passband containing a high level of noise, if the ratio SNR is known for the signal power of the transmitted signal carries over the noise power for a unit passband. It can be deduced therefrom that a certain number of decisions will be wrong. Given that a wrong decision cancels a right decision, the technique can operate effectively only if the probability of a bit of the W code being detected correctly is significantly greater than 50%.

OBJECTS AND SUMMARY OF THE INVENTION

An object of the present invention is to make it possible to increase the probability of correct detection.

The idea on which the invention is based is to establish a non-zero detection threshold to increase the difference between the probability of a correct decision and the probability of an incorrect decision.

The invention thus provides a method of processing the $L_1$ and $L_2$ signals in a satellite positioning system such as the GPS system, in which each of said $L_1$ and $L_2$ signals has a single frequency carrier modulated by a known pseudo-random code P, which is itself modulated by an unknown code W, in which:

a) in separate systems for each of the signals $L_1$ and $L_2$ correlation is performed with a locally-generated replica of the P code, respectively in a first system for processing the signal $L_1$ and in a second system for processing the signal $L_2$, thereby producing respective first and second correlation signals;

b) the first and second correlation signals are integrated over a period equal to an estimated period for one bit of the W code to obtain respective first and second W code bit signals; and c) the first and/or second W code bit signals are cross-correlated with the second and/or first correlation signals respectively, wherein, between b) and c), the method tests firstly whether the first W code bit signal is greater than a first positive threshold value or less than a first negative threshold value, and/or secondly whether the second W code bit signal is greater than a second positive threshold value or less than a second negative threshold value, and for said cross-correlation, the first and/or second W code bit signal is retained only if the corresponding test is satisfied.

It is particularly advantageous, after c), for the number of unsuccessful tests to be counted for a given period and compared with a reference value, and at least one of said threshold values to be adapted accordingly.

Preferably, said counting is performed for each of said tests performed on each of said first and second W code bit signals, adaptation being performed on each of said threshold values.

Advantageously, said adaptation is performed in a loop having a first or second order loop filter.

In general, the method applies to the in-phase and to the quadrature components of the signals $L_1$ and $L_2$.

Said correlation of the P codes may be performed on the punctual code, on the early code, and/or on the late code.

BRIEF DESCRIPTION OF THE DRAWING

Other characteristics and advantages of the invention appear more clearly on reading the following description given by way of non-limiting example and made with reference to the accompanying drawing, in which.

MORE DETAILED DESCRIPTION

Figure 1:
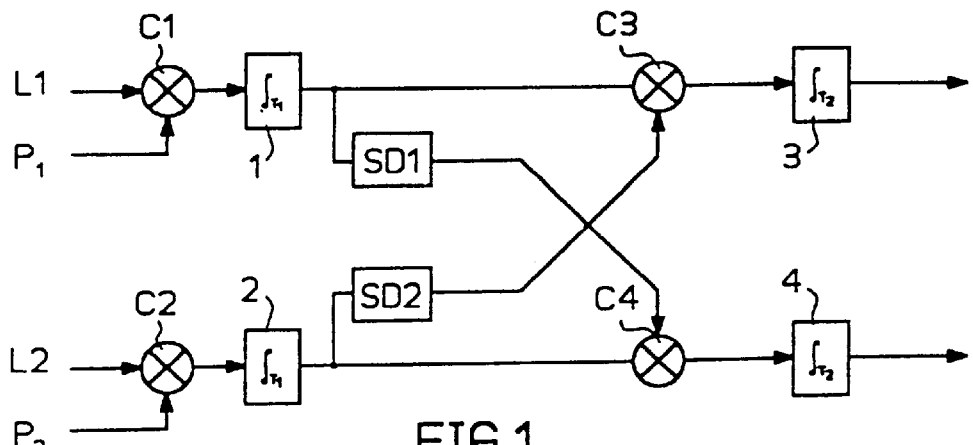
FIG. 1 is a diagram showing the method of above-mentioned U.S. Pat. No. 5,134,407.

In FIG. 1, the prior art device has two correlators C1 and C2 respectively receiving samples of the demodulated signals $L_1$ and $L_2$, and also respectively receiving locally-generated replicas $P_1$ and $P_2$ of the P code. The signals present at the outlets from the correlators C1 and C2 are subsequently filtered by integration over a time $T_1$ which is equal to a multiple of the P code cycle and which corresponds to the estimated duration for one bit of the W code. This integration is performed by respective integrators 1 and 2. The signs of the integrated signals are generated by sign detectors SD1 and SD2 on the basis of the signals integrated by the respective integrators 1 and 2. Cross-correlation is implemented on the basis firstly of correlation performed by a correlator C3 between the output signal from the integrator 1 and the output signal from the sign detector SD 2, and/or by correlation performed by a correlator C4 on the basis of the signal output by the integrator 2 and the signal output by the sign detector SD1. This is followed by integration over a period $T_2 > T_1$ performed by respective integrators 3 and/or 4.

The invention provides a method that enables the performance of the cross-correlation to be improved.

The idea on which the invention is based is to use thresholding to increase the difference between the probability of obtaining a decision that is correct and the probability of obtaining a decision that is incorrect or wrong.

This difference can be increased by introducing a non-zero threshold level on the basis of which the sign of the W code bit is decided.

The threshold is preferably adaptive to ensure an optimum result, and in particular to keep the tracking bandwidth constant.

As in the above-described technique, the signals $L_1$ and $L_2$ are correlated ($C_{11}$–$C_{12}$) with locally-generated P codes $P_1$ and $P_2$, and then integrated (11, 12) for a duration $T_1$. The P codes are generated either in the form of two separately generated codes that are aligned with the P code of the incoming signal, or else by generating a first P code ($P_1$ or $P_2$), and then deriving the other P code ($P_2$ or $P_1$) therefrom by phase shifting. The W code is tested relative to thresholds, a positive threshold and a negative threshold, which thresholds are preferably adaptive, with the signal including the noise level contained therein being required to exceed the thresholds in order for a decision concerning the sign of the W code bit to be taken into account. Samples which do not pass the threshold test are rejected. A certain fraction of the decisions which are taken into account constitute correct decisions and a certain fraction constitute incorrect decisions.

Figure 2:
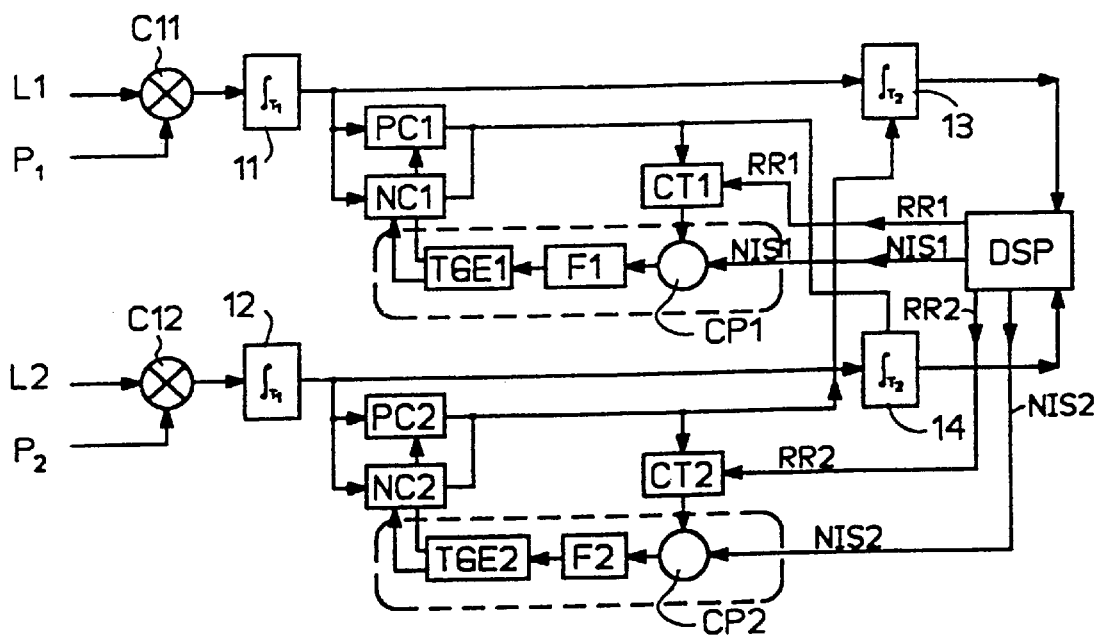
FIG. 2 shows a preferred embodiment of the invention.

FIG. 2 shows the method of the invention for the in-phase I components of the signal in the context of the punctual P code. As for the quadrature components Q and the correlations with the early and late P code signals, the concept is implemented in the same manner.

Whereas the prior art method does not use a threshold, i.e. it uses a zero threshold for determining the sign of the W code bit, in the invention, each of the signals output by the integrators 11 and 12 is compared with a positive threshold and with a negative threshold. If the threshold test is satisfactory, for example if the signal output by the integrator 11 is greater than the positive threshold or less than the negative threshold, then the sign of the corresponding W code bit is taken into account at the input of the integrator 14 which integrates for a period $T_2$ on the basis of the sign bit signal taken into consideration for the W code and of the signal output by the integrator 12. The same applies to the signal at the output from the integrator 12 which, if it satisfies the threshold test, will have its sign value correlated in crossed manner with the output signal from the integrator 11.

Downstream from the integrator 11, the first branch dealing with the signal $L_1$ includes, for this purpose, two threshold detectors, respectively a positive threshold detector PC1 and a negative threshold detector NC1, and the validated result of the comparison is applied to one of the inputs of the correlator-integrator 14. If the comparison does not pass the threshold test, then the signal at the input of the integrator 14 is ignored. A comparator CT1, e.g. a 14-bit comparator, detects samples that are to be ignored and accumulates therefrom the preference count for duration $T_2$. This count is compared in a comparator CP1 with the desired value NIS1 supplied by a microprocessor DSP which also supplies a reset-to-zero signal RR1 and a counter read signal CT1 at intervals of $T_2$. The digital signal output from the comparator CP1 is applied to a loop filter F1, e.g. a first-order filter, and then to a circuit TGE 1 which adjusts the values of the threshold detectors PC1 and PC 2. If the number of ignored samples is greater than the reference value, then the absolute values of the positive and negative thresholds are decreased, and vice versa.

The same applies to the second branch dealing with the signal $L_2$, in which the elements PC2, NC2, CT2, CP2, F2, and TGE2, and the signals RR2 and NIS2 correspond respectively to the elements PC1, NC1, CT1, CP1, F1, and TGE1, and to the signals RR1 and NIS1.

The same treatment can be applied to the quadrature components of the signals $L_1$ and $L_2$.

Branches can be allocated to the early (or E) P code and to the late (or L) P code, both for the in-phase I and/or the quadrature Q components of the signals $L_1$ and $L_2$. The processing therein is likewise similar.

The second step of conventional integration 13, 14 can be implemented using a simple up/down counter, e.g. operating as follows:

when the threshold test is not satisfied, the up/down counter is deactivated;

when the threshold test is satisfied for the positive threshold $S_1$, the counter is incremented, e.g. by unity; and when the threshold test is satisfied for the negative threshold $S_2$, the counter is decremented, e.g. by unity.

Figure 3A:
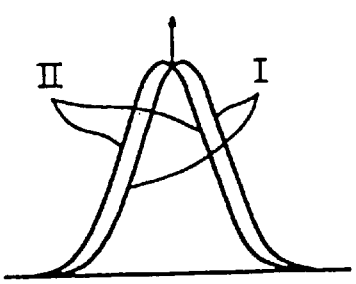
FIGS. 3a and 3b are probability density curves respectively in the absence of thresholding (prior art FIG. 3a) and in the presence of thresholding performed in accordance with the invention (FIG. 3b).
Figure 3B:
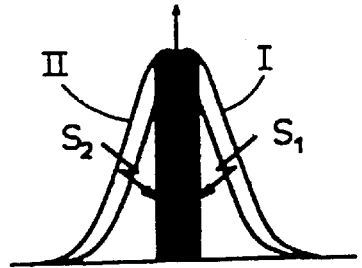

In FIG. 3a, the ordinate represents error probability as a function of level for a W code bit of positive sign (curve I) and for a W code bit of negative sign (curve II). The area shows the overall probability of error concerning positive and negative decisions and in the absence of a threshold. FIG. 3b shows the same curves I and II, to which the positive and negative thresholds $S_1$ and $S_2$ have been applied, which amounts to eliminating the zone shown in dark area, where the probability of error is at its highest.

Accumulating only a fraction of the samples that result from correlation with the P code increases the post-detection passband, and consequently its noise level, which means that it might be thought, a priori, that eliminating samples by thresholding would be unfavorable.

In reality, the degradation of the signal-to-noise ratio is small given that the already low signal-to-noise ratio gives rise to overlap comprising probability density curves I and II for the positive and negative codes (FIG. 3a). With reference to FIG. 3b, the dark area represent decisions that are rejected (in the example shown, about 50% of all decisions concerning the sign of the W code bit). The non-shaded zones represent correct decisions amongst the decisions which are retained, while the dark area represents incorrect decisions amongst the decisions that are retained. The percentages of the various zones compared with the total area can be calculated, and they are summarized in the following table:

| Threshold (normalized on signal level) | $E_1$ = % of samples ignored | $E_2$ = % of samples correct | $2E_2 - 100$ |
|---|---|---|---|
| 0 (prior art) | 0 | 58.3 | 16.5 |
| 0.5 | 8.2 | 58.9 | 17.8 |
| 1 | 15.9 | 59.6 | 19.1 |
| 1.5 | 24.2 | 60.3 | 20.6 |
| 2 | 31.5 | 61 | 22 |
| 2.5 | 38.6 | 61.7 | 23.5 |
| 3 | 45.9 | 62.5 | 25.1 |
| 3.5 | 52.2 | 63.3 | 26.5 |
| 4 | 58.1 | 64 | 28 |
| 5 | 68.9 | 65.6 | 31.2 |

The values in the table correspond to the case where SNR=40 dBHz at the frequency $L_1$.

$E_1$ represents the percentage of samples ignored.

$E_2$ represents the percentage of correct decisions from among the samples retained.

The last column represents the percentage difference $(2E_2-100)$ between correct decisions and incorrect decisions as accumulated, taken from amongst the samples which are retained.

As shown in the above table, the threshold test performed in accordance with the invention makes it possible to increase the relative percentage of correct decisions retained and decisions which cancel one another. The increase of this relative percentage makes it possible to decrease the loss of power during integration. In the prior art, this percentage is 16.5%. It increases with threshold level to reach 31.2% for the last example in the table.

The thresholds can be adapted by means of a loop whose error signal is a function of the difference between the number of samples rejected (or conserved) over a given duration, e.g. $T_2$, and a reference value. After optional filtering, a new threshold is calculated. Given that the level is generally not the same for the signals $L_1$ and $L_2$, four independent registers are used for storing the thresholds of the in-phase $L_1$ branch, for the quadrature $L_1$ branch, for the in-phase $L_2$ branch, and for the quadrature $L_2$ branch. In general, the threshold will have the same value for the punctual P code, for the early P code E, and for the late P code L. A relative threshold $S_1$ and the corresponding negative threshold $S_2$ will generally have the same absolute value.

In general, the loop filter ($F_1$, $F_2$) is a first order filter. For example it can be an integrator. However, the number of correct decision depends on the signal-to-noise ratio which, in some cases, can vary rapidly. In such extreme cases, it can be necessary to implement a second order filter or to incorporate a comparator in the processor DSP to test whether the percentage of rejected samples is too high and consequently to force the thresholds to the value zero so as to reinitialize the threshold adapting loop. When the signal-to-noise ratio degrades, the percentage of rejected samples cannot be controlled by modifying the threshold value.

Experiments have shown that a significant increase in signal-to-noise ratio can be obtained by assuming that the bit rate of the W code is $\frac{1}{22}$ of the bit rate of the P code.

This amounts to assuming that the W code is coherent with instant X1A which occurs every 4092 bits of the P code, i.e. that there are 4092/22=186 bits of W code per interval between two instants X1A, which is more plausible than 4092/20=204.6 bits of W code that is obtained by assuming that the length of a W code bit is 20 times that of a P code bit.

In the invention, the number of P code bits that are accumulated before making a decision is adjustable, but the preferred standard value is equal to 22.

The predetection passband for integration over the length of a W code bit, i.e. 22 P code bits is:

$B=10.23/22$ MHz=0.465 MHz, giving a noise level Pn=kTB=−146.4 dB.

The minimum guaranteed power for the P code of the signal $L_1$ is −163 dB, i.e. a signal-to-noise ratio SNR of $-163-(-146.4)=-16.6$ dB.

For the minimum guaranteed power of the P code of the signal $L_1$, the probability of an erroneous decision concerning the W code bit is:

$P_E = \frac{1}{2}$ erfc $(SNR^{1/2})=0.417$

In the prior art, all decisions concerning the W code bit are accumulated whether correct or otherwise, and the net number of correct decisions is:

$$P_N = 1 - 2P_E = 0.166$$

thereby degrading the signal-to-noise ratio by $D = 20\log_{10}(0.166) = -15.6$ dB.

This is as observed using prior art techniques, but choosing to accumulate over 22 P code bits, i.e. $T_1 = 2.15$ μs.

The two curves of accumulation probability density during one bit of the W code are shown in FIGS. 3a and 3b, and the values for the probability of a right decision are given in the table above.

As the threshold increases, the percentage of decisions retained concerning the W code bit fall, however of those decisions that are retained, the percentage of decisions that are correct rises. This has two effects on the signal-to-noise ratio. Firstly the apparent signal-to-noise ratio decreases because fewer decisions are accumulated, thereby reducing the effect of noise filtering. Secondly, the signal-to-noise ratio increases because of the increase in the number of decisions that are correct.

Although the accumulation time $T_2$ remains unchanged when implementing a non-zero threshold, the number of decisions accumulated in the period is smaller. Since the effect of filtering depends solely on accumulating a certain number of samples, by the effect of averaging over the integration time $T_2$, the passband of the filter is increased. This decreases the apparent integration time $T'_2$.

EXAMPLE
Degradation D of Signal-to-noise Ratio

1) Prior art: $D = -15.6$ dB.

2) 50% of decisions are accumulated over an integration time $T_2$ of 1 ms, i.e. over an apparent integration time $T'_2$ of 0.5 ms giving
$D = -11.5$ dB, i.e. an improvement of 4.1 dB, other things remaining equal.

3) 25% of decisions are accumulated ($T_2 = 1$ ms, $T'_2 = 0.25$ ms)
$D = -9.3$ dB, i.e. giving an improvement of 6.3 dB.

It might appear illogical to eliminate three-fourths of decisions concerning the W code bit, however in a normal situation, the only reason for increasing the time $T_2$ beyond 1 ms (up to 20 ms which is the period of one GPS data bit) is to reduce the noise passband prior to the decision process. In a code-less technique, regardless of whether a zero threshold is used or a non-zero threshold is used, and preferably in a technique that is adaptive as in the present invention, a decision is taken after 2.15 μs. Accumulations over 1 μs and longer take place after the decision has been made and serve only to reduce noise for the tracking loop situated downstream. This has no effect on the signal-to-noise ratio of the upstream signal.

The invention does not apply only to the GPS system. It is equally applicable, for example, to the GLONASS system which uses the same $L_1$ and $L_2$ signals as the GPS system.

What is claimed is:

1. A method of processing the $L_1$ and $L_2$ signals of a satellite positioning system such as the GPS system, in which each of said $L_1$ and $L_2$ signals has a single frequency carrier modulated by a known pseudo-random code P, which is itself modulated by an unknown code W, in which:

a) in separate systems for each of the signals $L_1$ and $L_2$ correlation is performed with a locally-generated replica of the P code, respectively in a first system for processing the signal $L_1$ and in a second system for processing the signal $L_2$, thereby producing respective first and second correlation signals;

b) the first and second correlation signals are integrated over a period equal to an estimated period for one bit of the W code so as to obtain respective first and second W code bit signals; and c) the first and/or second W code bit signals are cross-correlated with the second and/or first correlation signals respectively, wherein, between b) and c), the method tests firstly whether the first W code bit signal is greater than a first positive threshold value or less than a first negative threshold value, and/or secondly whether the second W code bit signal is greater than a second positive threshold value or less than a second negative threshold value, and for said cross-correlation, the first and/or second W code bit signal is retained only if the corresponding test is satisfied.

2. A method according to claim 1, wherein, after c), the number of unsuccessful tests is counted for a given period and compared with a reference value, and at least one of said threshold values is adapted accordingly.

3. A method according to claim 2, wherein said counting is performed for each of said tests performed on each of said first and second W code bit signals, and wherein adaptation is performed on each of said threshold values.

4. A method according to claim 2, wherein said adaptation is performed in a loop having a first or second order loop filter.

5. A method according to claim 1, applying to the inphase and to the quadrature components of the signals $L_1$ and $L_2$.

6. A method according to claim 1, wherein said correlation of the P codes is performed on the punctual code, on the early code, and/or on the late code.

7. A method according to claim 1, wherein said estimated period for one bit of the W code is equal to 22 times the duration of one bit of the P code.

* * * * *